(12) United States Patent
Antani (10) Patent No.: US 8,108,522 B2
(45) Date of Patent: Jan. 31, 2012

(54) AUTONOMIC DEFINITION AND MANAGEMENT OF DISTRIBUTED APPLICATION INFORMATION

(75) Inventor: Snehal S. Antani, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 11/940,119

(22) Filed: Nov. 14, 2007

(65) Prior Publication Data

US 2009/0125619 A1 May 14, 2009

(51) Int. Cl.
*G06F 15/173* (2006.01)
*G06F 9/46* (2006.01)

(52) U.S. Cl. ........ 709/226; 709/223; 709/224; 718/104; 702/108

(58) Field of Classification Search .......... 709/223–226; 718/104
See application file for complete search history.

(56) References Cited

U.S. PATENT DOCUMENTS

| | | | |
|---|---|---|---|
| 7,584,281 B2 * | 9/2009 | Bernardin et al. | 709/226 |
| 7,765,552 B2 * | 7/2010 | Miller et al. | 718/104 |
| 2002/0169644 A1 | 11/2002 | Greene | |
| 2004/0243692 A1 | 12/2004 | Arnold et al. | |
| 2005/0021530 A1 * | 1/2005 | Garg et al. | 707/100 |
| 2005/0193222 A1 | 9/2005 | Greene | |
| 2005/0256947 A1 | 11/2005 | Devarakonda et al. | |
| 2005/0283822 A1 | 12/2005 | Appleby et al. | |
| 2006/0085544 A1 * | 4/2006 | Chen et al. | 709/226 |
| 2006/0271600 A1 | 11/2006 | Goh et al. | |
| 2006/0277307 A1 * | 12/2006 | Bernardin et al. | 709/226 |
| 2006/0294238 A1 * | 12/2006 | Naik et al. | 709/226 |
| 2007/0033194 A1 | 2/2007 | Srinivas et al. | |
| 2008/0010293 A1 * | 1/2008 | Zpevak et al. | 707/10 |
| 2008/0256238 A1 * | 10/2008 | Hu et al. | 709/226 |

FOREIGN PATENT DOCUMENTS

WO WO 2006/061262 6/2006

* cited by examiner

*Primary Examiner* — Ashok Patel
*Assistant Examiner* — Linglan Edwards
(74) *Attorney, Agent, or Firm* — Jose Gutman; Fleit Gibbons Gutman Bongini & Bianco PL (57) ABSTRACT

A method, information processing system, and computer program storage product for associating jobs with resource subsets in a job scheduler. At least one job class that defines characteristics associated with a type of job is received. A list of resource identifiers for a set of resources associated with the job class is received. A set of resources available on at least one information processing system is received. The resource identifiers are compared with each resource in the set of resources available on the information processing system. A job associated with the job class with is scheduled with a set of resources determined to be usable by the job based on the comparing.

20 Claims, 8 Drawing Sheets

| HOUR INTERVAL | RESPONSE TIME (ms) | SAMPLE SIZE |
| --- | --- | --- |
| 2/11/2007 0:00 | 147 | 5 |
| 2/11/2007 1:00 | 53 | 6 |
| 2/11/2007 2:00 | 1 | 3 |
| 2/11/2007 3:00 | 12 | 5 |
| 2/11/2007 4:00 | 1584 | 3 |
| 2/11/2007 5:00 | 1 | 6 |
| 2/11/2007 6:00 | 203 | 4 |
| 2/11/2007 7:00 | 61 | 6 |
| 2/11/2007 8:00 | 165 | 8 |
| 2/11/2007 9:00 | 100 | 5 |
| 2/11/2007 10:00 | 34 | 8 |
| 2/11/2007 11:00 | 8 | 11 |
| 2/11/2007 12:00 | 52 | 10 |
| 2/11/2007 13:00 | 99 | 13 |
| 2/11/2007 14:00 | 31 | 9 |
| 2/11/2007 15:00 | 453 | 13 |
| 2/11/2007 16:00 | 63 | 11 |
| 2/11/2007 17:00 | 25 | 9 |
| 2/11/2007 18:00 | 159 | 11 |
| 2/11/2007 19:00 | 55 | 4 |
| 2/11/2007 20:00 | 12 | 7 |
| 2/11/2007 21:00 | 45 | 7 |
| 2/11/2007 22:00 | 7 | 5 |
| 2/11/2007 23:00 | 3 | 7 |
| 2/12/2007 0:00 | 74 | 5 |
| 2/12/2007 1:00 | 79 | 4 |
| 2/12/2007 2:00 | 18 | 4 |

FIG. 3

| Name | Response Time(ms) | Priority | Response Time Goal (ms) |
|---|---|---|---|
| injreh06Coman_ResponseTime.csv | 1484.877583 | Highest | <=5000 ms |
| wasi06DirectDeposit_ResponseTime.csv | 177.1148434 | High | <=1000 ms |
| wasi0507MarketManager_ResponseTime.csv | 1735.004827 | High | <=5000 ms |
| wasi0507CorporateOrder_ResponseTime.csv | 1004.734177 | Medium | <=5000 ms |
| wasi0507GRS_ResponseTime.csv | 18.32962963 | Medium | <=1000 ms |
| wasi0507MCReports_ResponseTime.csv | 1293.038168 | Medium | <=5000 ms |
| wasi0507EnergyWeb_ResponseTime.csv | 1.717391304 | Medium | <=1000 ms |
| wasi0507GlobalReturns_ResponseTime.csv | 101.6285714 | Medium | <=1000 ms |
| wasi0507EBilling_ResponseTime.csv | 8514.587302 | Medium | <=15000 ms |
| wasi06WireLiteSearch_ResponseTime.csv | 268.6530612 | Low | <=1000 ms |
| wasi0507MarkdownStrat_ResponseTime.csv | 5028.175 | Low | <=15000 ms |
| wasi0507FPFS_ResponseTime.csv | 248.5384615 | Low | <=1000 ms |
| wasi0507Automation_ResponseTime.csv | 3852 | Lowest | <=1000 ms |
| wasi0507RJointVentures_ResponseTime.csv | 3 | Lowest | <=10000 ms |
| wasi0507PriceBlocking_ResponseTime.csv | 3 | Lowest | <=1000 ms |

AUTONOMIC DEFINITION AND MANAGEMENT OF DISTRIBUTED APPLICATION INFORMATION

FIELD OF THE INVENTION

The present invention generally relates to the field of dynamic or virtualized computing environments, and more particularly relates to automatically and dynamically defining and managing service policies for applications migrating from a static computing environment to a virtualized computing environment.

BACKGROUND OF THE INVENTION

Various types of computing environments are utilized by businesses according to their computing needs. One type of computing environment is a static or distributed-based computing environment. In this type of environment, each application is associated with its own dedicated resource such as a processor. A static computing environment can become very expensive depending on the number of applications being used. Also, the resources in a static environment are underutilized and wasted. Therefore, many businesses that implement a static environment desire to migrate to a dynamic or virtualized computing environment where fewer resources are required and groups of applications share the same resources.

However, migrating from a static computing environment to a virtualized environment creates various problems. As stated above, applications share and compete for resources in a virtualized computing environment. Distributed-based customers with large middleware infrastructures may not have non-functional requirements such as relative business priority or response time goals defined for every (or any) application that is to be deployed to a goals-based shared middleware environment such as WebSphere Extended Deployment. This is because applications within a static computing environment are each allocated a separate resource.

Therefore, the virtualized environment does not comprise the relative priorities and non-functional requirements such as response-time goals for the migrated applications that are needed to mange the shared resources of the environment. Furthermore, assigning/evaluating the aforementioned non-functional requirements can be politically difficult due to the subjectivity of the decisions. Also, manual (and subjective) evaluation can be resource intensive and can yield inaccurate results. Furthermore, the management of non-functional requirements over time; ensuring the accuracy of existing policies; and defining new policies can be extremely difficult.

Capacity Planning Teams and Project Strategy Teams, for example, can determine up front non-functional requirements such as business priority and response-time goals as part of the formal application development process. This static definition process is only successful when the process has been executed. However, this process may not have been executed (and therefore the definitions do not exist) if a service-policy-based infrastructure has been applied to a set of applications after the non-functional requirements have been defined and gathered.

Therefore a need exists to overcome the problems with the prior art as discussed above.

SUMMARY OF THE INVENTION

Briefly, in accordance with the present invention, disclosed are a method, information processing system, and computer readable storage medium for automatically managing service policies for applications migrating from a static computing environment to a dynamic computing environment. The method includes monitoring usage data associated with each application in a plurality of applications deployed within a computing environment. The usage data which has been monitored is analyzed. Service level agreements associated with each application in the plurality of applications are generated in response to the analyzing. The computing environment is configured with the service level agreements for managing resource sharing between each of the applications.

In another embodiment, an information processing system for autonomic management of service policies for applications migrating from a static computing environment to a dynamic computing environment is disclosed. The information processing system includes a memory and a processor that is communicatively coupled to the memory. The information processing system also includes a resource manager that is communicatively coupled to the memory and the processor. The resource manager is adapted to monitor usage data associated with each application in a plurality of applications deployed within a computing environment. The usage data which has been monitored is analyzed. Service level agreements associated with each application in the plurality of applications are generated in response to the analyzing. The computing environment is configured with the service level agreements for managing resource sharing between each of the applications.

In yet another embodiment, a computer readable storage medium for automatically managing service policies for applications migrating from a static computing environment to a dynamic computing environment is disclosed. The computer readable medium comprises instructions for monitoring usage data associated with each application in a plurality of applications deployed within a computing environment. The usage data which has been monitored is analyzed. Service level agreements associated with each application in the plurality of applications are generated in response to the analyzing. The computing environment is configured with the service level agreements for managing resource sharing between each of the applications.

One advantage of the present invention is that service policies for applications migrating from a static computing environment to a dynamic resource-sharing environment can be automatically and dynamically created and managed. These service policies are used to help facilitate the adoption of goals-oriented virtualized middleware runtimes. An existing infrastructure can be analyzed for the assignment of relative priorities, response-time goals, and other such service-policy meta-data to a goals-oriented runtime environment like WebSphere XD. The creation and management process can then become fully autonomous where the analysis can be executed within some frequency and the service-policy data is adjusted to accommodate changes in application usage, handle newly deployed applications by considering their effects on existing apps.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Computing Environment

Figure 1:
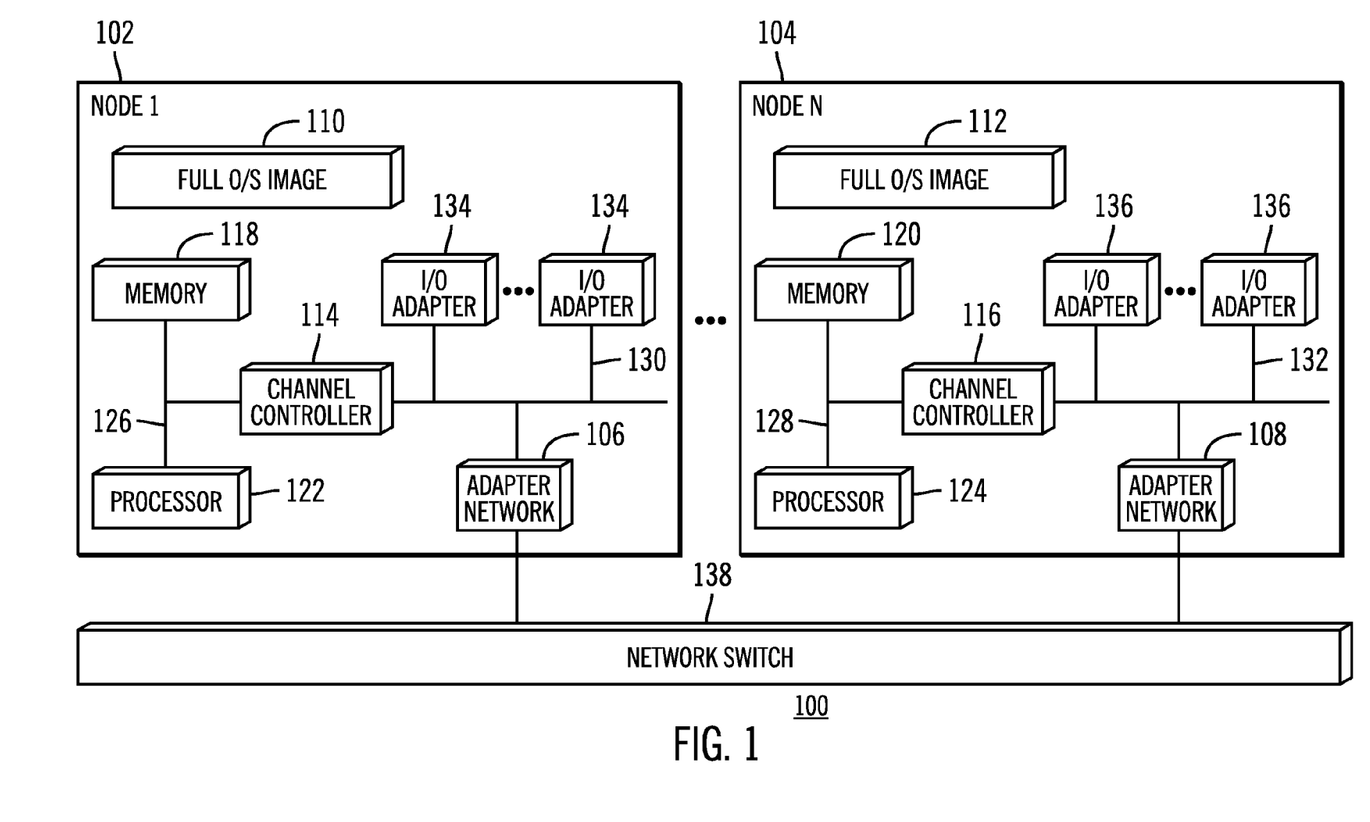
FIG. 1 is a block diagram illustrating an example of a computing environment, according to an embodiment of the present invention.

FIG. 1 is a block diagram illustrating an example of a computing environment according to an embodiment of the present invention. It should be noted that the present invention can be scaled across multiple processing nodes such as in the computing environment of FIG. 1 or can reside at a single node.

In the illustrated embodiment, the computing environment 100 is one example of a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114,116; memory 118,120; and processor(s) 122, 124 on a system memory bus 126, 128. A system input/output bus 130, 132 couples I/O adapters 134,136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102,104 are part of a processing cluster.

Autonomic Service-Policy Management

As discussed above, a customer, in one embodiment, is migrating from a static computing environment to a dynamic or virtualized environment. In one embodiment, the virtualized environment comprises a goals-oriented runtime environment such as WebSphere Extended Deployment. The goals-oriented runtime environment uses services and/or policies to manager applications when running under load. Unfortunately, customers with large ND-Distributed production environments most likely did not incorporate service policies—service level agreements, relative application priority, and so on—when those environments were built. Therefore creating these policies after the non-functional requirements for the applications have been defined can be difficult, time consuming, and highly subjective.

Applications deployed in a static cluster environment such as WebSphere ND are typically isolated, i.e., one application per server per box. With this isolation, applications that perform poorly can only affect themselves. In a shared-resource environment, this isolation is eliminated. Applications are running on virtualized hardware and therefore, at the lowest hardware levels, are competing for the same resources such as CPU, memory, and so on. Applications must therefore be prioritized such that when load occurs, shared resources are allocated to applications of higher priority. This model places more responsibility on the application, where a poorly performing application of higher priority can negatively affect all applications of lower priority. Stated differently the isolation of a static environment does exist in a shared-resource environment.

When moving to a shared-resource runtime be it z/OS, WebSphere Extended Deployment, etc. workload priorities, response-time goals, and other such service-policy metadata must be defined with care. Additionally, applications of the highest priority need to be optimized. Goals-oriented runtimes try to ensure that applications of lower priority are not starved of resourced, but the allocation of the shared resources to higher priority work negatively influence the execution-time of work that is deemed less important.

An essential step to take when migrating to a virtualized, goals-oriented runtime is to ensure that applications (especially applications of higher priority) can scale. A dynamic environment such as WebSphere XD, WebSphere z/OS, etc will start multiple instances of the application to try to meet the specific workload goals. If the application does not scale well, resources will be inefficiently provisioned as these additional application instances are created. If a bottleneck exists in the application—all transactions must exclusively access a single row in a table for example—these application server instances may not help the runtime meet the stated service goals. Additional server instances will therefore waste resources and negatively affect other work.

Therefore, one embodiment of the present invention dynamically and automatically creates and manages service policies that can be used to help facilitate the adoption of goals-oriented, virtualized middleware runtimes. One embodiment of the present invention introspects an existing infrastructure and assigns relative priorities, response-time goals, and other such service-policy meta-data to a goals-oriented runtime environment like WebSphere XD. The creation and management process can then become fully autonomous where the analysis can be executed within some frequency and the service-policy data is adjusted to, for example, accommodate changes in application usage, and handle newly deployed applications by considering their effects on existing apps.

Figure 2:
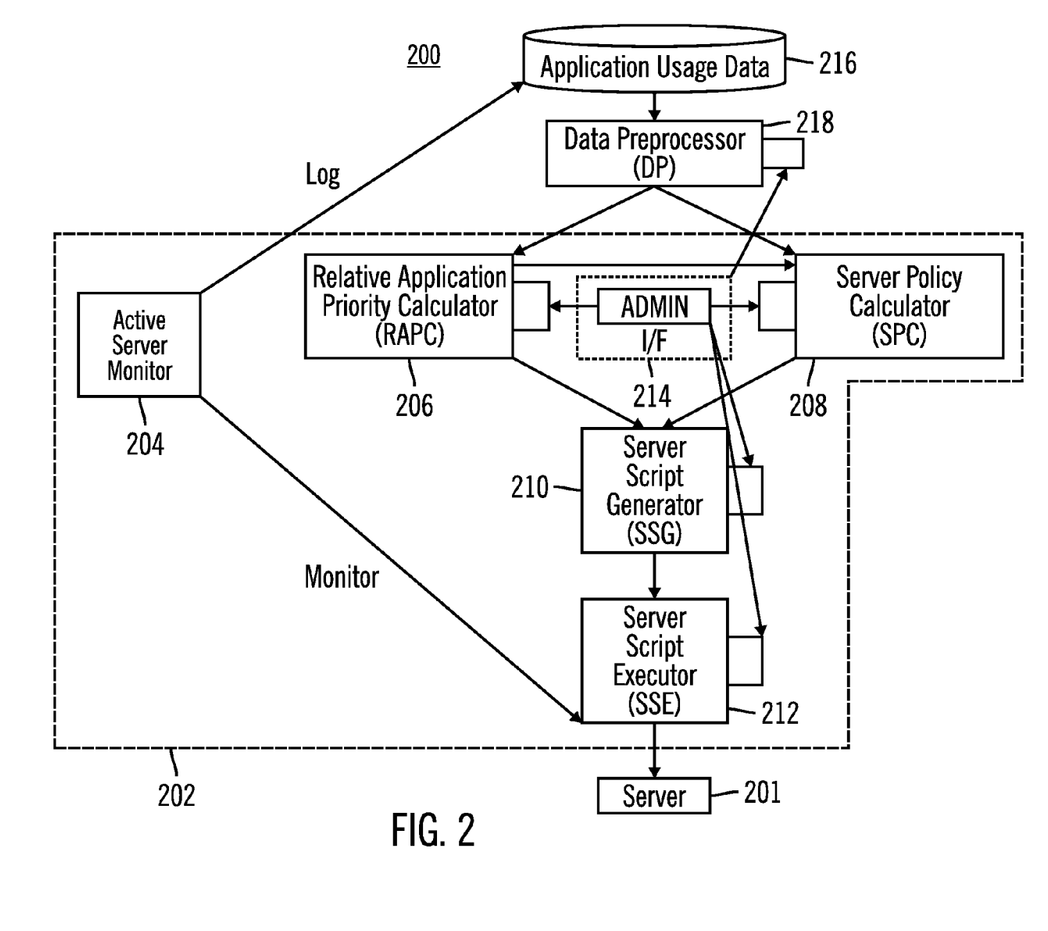
FIG. 2 is a block diagram illustrating an example of a system for autonomic service-policy management according to an embodiment of the present invention.

FIG. 2 shows one example of a system 200 for autonomic and dynamic service-policy management. The system 200 of FIG. 2, in one embodiment, dynamically and automatically creates and manages service/policies that are used for facilitating the adoption of goals-oriented, virtualized middleware runtimes. In one embodiment, a resource manager 202 for automatically creating and managing service/policies comprises an Active Server Monitor 204, a Relative Application Priority Calculator ("RAPC") 206, a Service Policy Calculator ("SPC") 208, a Server Script Generator ("SSG") 210, a Server Script Executor ("SSE") 212, and an administrative interface 214.

The Active Service Monitor 204, in one embodiment, introspects the existing infrastructure environment 102 and collects application usage data from data sources such as (but not limited to) IBM Tivoli Composite Application Management ("ITCAM") and Apache HTTP logs. Application usage data can be data such as the number of hours an application was used; response times of the applications; and other such usage metrics. The application usage data, in one embodiment, is stored within a database 216. A Data Preprocessor (which can be predefined by an administrator) applies various preprocessing algorithms to the collected application usage data. In one embodiment, the Data Preprocessor 218 transforms the raw input data into usage metrics for the subsequent decision algorithms. For example, given raw execution data, the Data Preprocessor 218 computes the average of that data which is then passed on to the RAPC 206 and SPC 208. The preprocessed data is then used by the RAPC 206 and SPC 208 to calculate, for example, relative priority, response time goals, and service policies. In one embodiment, an administrator can define policies used by the RAPC 206 and SPC 208 for calculating the priorities. The pseudo-code shown below gives an example in pseudo-code for generating application priorities.

TABLE 1

Priority Generation {
    For each Application in the environment:
        Compute Normalized Usage;
        Sort (descending) result data by Normalized Usage;
        Apply the following Priority distribution to the
    sorted list:
    tunable {
        First 10% of Applications: Highest Priority
        Next 15% of Applications: High Priority
        Next 40% of Applications: Medium Priority
        Next 25% of Applications: Low Priority
        Final 10% of Applications: Lowest Priority
    }
}

$$\text{Normalized Usage} = \frac{\left(\text{\# of hours that the App was used}\right)}{\left(\text{total \# of hours in the data}\right)} * \text{Total \# of times invocations in sample}$$

As can be seen from the above pseudo-code in Table 1, the RAPC 206 analyzes the preprocessed usage data and determines a normalized usage metric. In one embodiment, the normalized usage metric is determined by dividing the number of hours an application was used by the total number of hours in the collected data. This value is then multiplied by the total number of invocations in the sample. With respect to the example of pseudo-code in Table 1, the "total number of invocations" represents the number of times a given application was accessed within some defined time window. For example, application X was accessed 10 times within an hour, therefore its "total number of invocations" is 10. It should be noted that pseudo-code shows only one example for generating application priorities and does not limit the present invention.

In one embodiment, the normalized usage data can be sorted for easy viewing of the data. An adjustable priority distribution can be applied to the normalized usage data. The above pseudo-code shows an example of the priority distribution. For example, the above pseudo-code shows that the first 10% of applications of a list sorted in descending order are assigned the "Highest Priority" level. The next 15% of applications are assigned a "High Priority" level. The next 40% applications are assigned a "Medium Priority" level. The next 25% of applications are assigned a "Low Priority" level. The final 10% of applications are assigned a "Lowest Priority" level. It should be noted that this is only an example and the priority distribution can be configured with distribution.

Table 2 shown below gives an example in pseudo-code for generating response time goals, which indicate the time an application needs to respond in.

TABLE 2

Response Time Goals Generation {
    Tunable {
        Statically define Response Time Goals (RTG) up front:
            <= 1000 ms; <= 5000 ms; <= 10000 ms
        Statically define a Buffer Scalar. Default value is 2
    }
    For each Application in the environment:
        Compute the Buffered Response Time
        For each statically defined Response Time Goal:
            If [ Buffered Response Time < Goal[i] ]
                Assign goal to that application
                End;
        Buffered Response Time = Buffer Scalar * App Response Time
}

Figure 3:
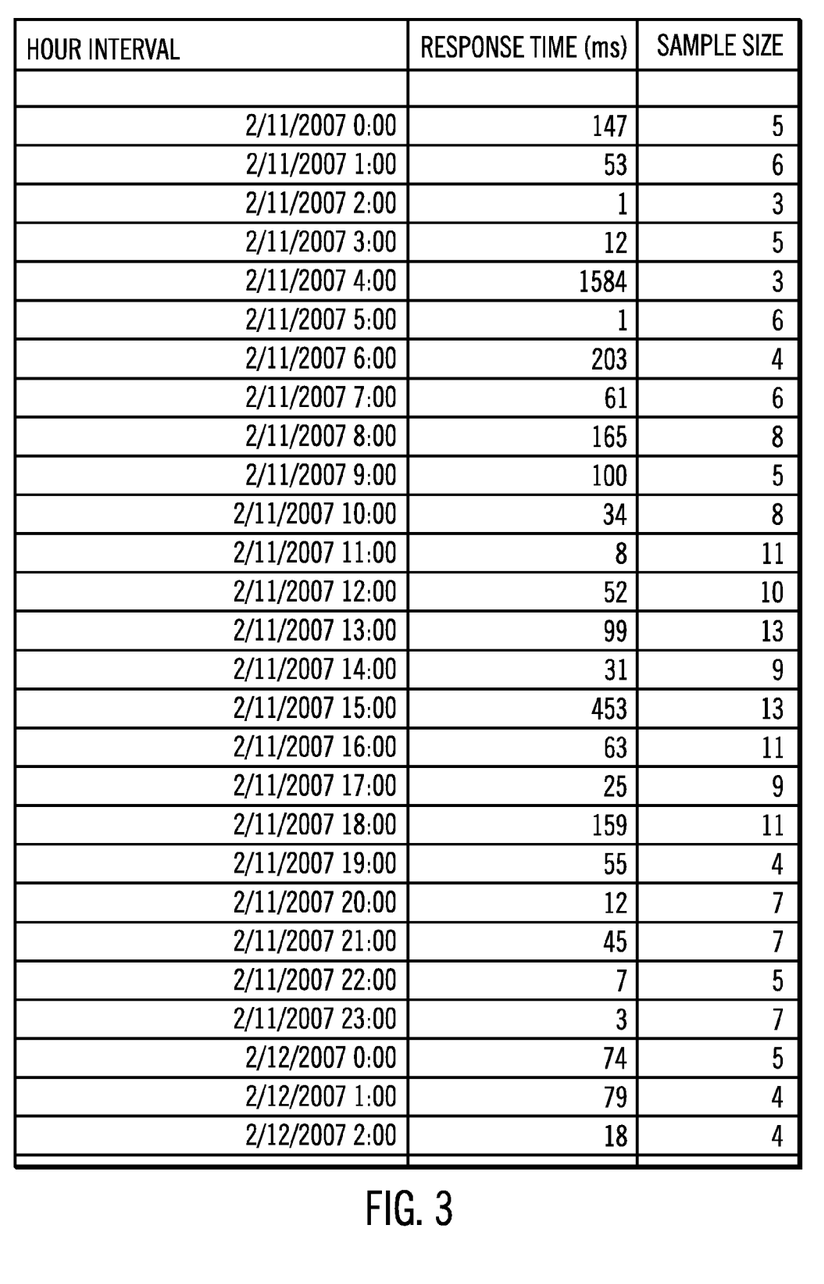
FIG. 3 is a table showing an example of response time for a set of applications deployed in a computing environment.

As can be seen from Table 2, the SPC 208 analyzes the preprocessed usage data and determines a buffered response time for each application. In one embodiment, buffered response time can be determined by multiplying a buffer scalar by the application response time. FIG. 3 shows example of response time data collected by the Active Server Monitor 204. In particular, FIG. 3 shows response times for a particular application. With respect to the example shown in Table 2, the "Hour Interval" is a 24 hour day broken into hour intervals. 0:00 is midnight, 1:00 is 1 am, 13:00 is 1 pm, and so on. The "Sample Size" is the number of times the application was accessed within that specific time window. Therefore at 1 pm, the application was accessed 13 times and yielded an average response time of 99 ms. It should be noted that Table 2 shows only one example of generating response time goals and does not limit the present invention.

In one embodiment, the response time goal categories and buffer scalar can be statically defined up front. It should be noted that the response time goal categories are adjustable and Table 2 only shows one non-limiting example. For example, Table 2 shows a first category of "less than or equal to 1000 ms", a second category of "less than or equal to 5000 ms", and a third category of "less than or equal to 1000 ms". The buffer scalar, in the example of Table 2, is set to a default value of 2. With respect to the example shown in FIG. 2, the buffer scalar is used to add more time to the average response time to ensure that it is not defined to be too aggressive. Another approach is to calculate the standard deviation of the response times and set the goal to be within three standard deviations of the mean. The SPC 208 analyzes the collected response time data for each application and compares this data to the response time goal categories. If the collected response times of the application are below a response time goal category then that category is assigned to the application.

It should be noted that one application can be deployed on more nodes than another application. Therefore, in this embodiment, multiple application usage data files can be merged into a single representation of usage data relative to the other application. For example, ITCAM response-time data provides three data entries for each node's data file: <Hour Interval>, <Response Time>, <Sample Size>. For merging multiple application usage data files so that they are relative to one another data can be represented as <Hour Interval>, <Average Response Time>, <Total Sample Size>. Also a scalar can be used to represent the relative weight difference of two applications.

It should also be noted that the present invention is not limited to only generating priorities or response-time goals. For example, Apache HTTP logs and XD visualization logs to define fine-grained URL priorities. Also, priorities can be determined based on CPU and I/O utilization such that high CPU and high I/O work is classified together for more efficient use of the underlying resources and subsystems. In another embodiment, for all requests with the same priority applications with similar response times can be identified. These applications can then be grouped in buckets and the resource manager 202 can then dynamically determine a more accurate response-time goal for that bucket.

Figure 4:
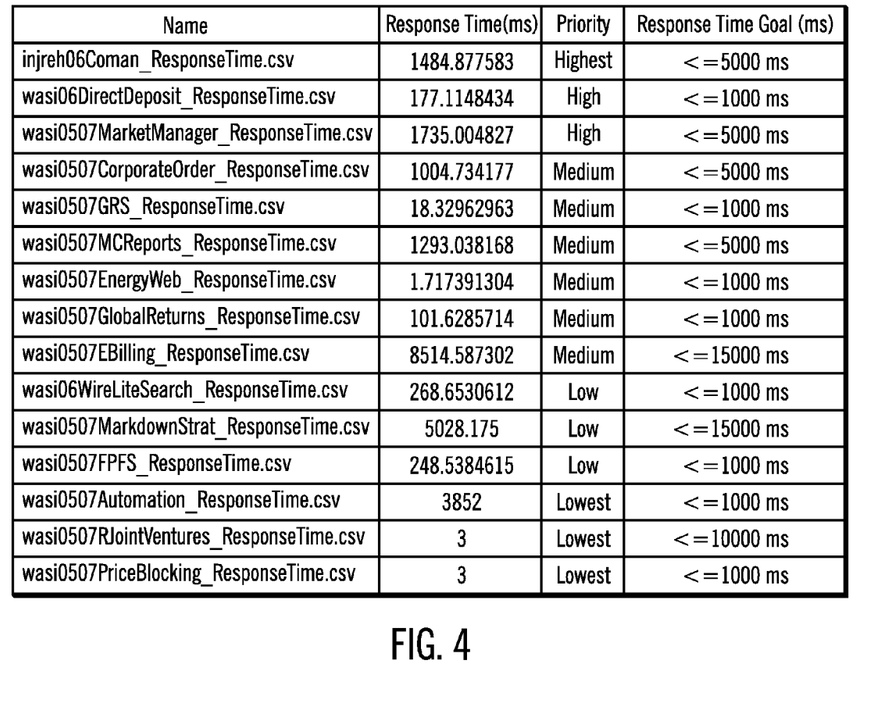
FIG. 4 is a table showing examples of relative priorities and response-time goals assigned to a group of applications according to one embodiment of the present invention.

FIG. 4 shows an example of the data generated by the RAPC 206 and the SPC 208. This data can be referred to as service level agreement data. In particular, FIG. 4 shows a plurality of applications 402, response times 404 associated with each application, a priority level determined by the RAPC 206 for each application, and a response time goal determined by the SPC 208 for each application.

It should be noted that a user such as an administrator can also interact with and configure the resource manager 202. For example, a user, via the user interface 214, can define preprocessing algorithms that the Data Preprocessor can user 218 for transforming the raw data into data that is usable by the RAPC 206 and the SPC 208. The user can also define policies that the RAPC 206 uses to generate priorities. For example, a user has deployed 300 applications and has determined the 5 most important applications from a business standpoint. Therefore, a user can instruct the RAPC 206 to not allocate the highest priority level. A user can similarly instruct the SPC 208 on how to generate application service policies. A user can also configure the format of the configuration scripts used to configure the application server environment 201. A user can even configure the application server environment 201. For example, a system administrator can modify the configurations that are specific to goals-oriented routing (for example the defined service policies, response time goals, and relative application priority) by executing administrative scripts.

The service level agreement data shown in FIG. 4 is used by the SSG 210 for generating application configuration server scripts. The SSE 212 executes the generated configuration scripts against the application server 201 to define, adjust, and/or manage the service level agreement policies for the deployed applications. In one embodiment, an administrator can configure the format of the configuration scripts and the SSE 212. The Active Server Monitor or some other background process continues to monitor and collect usage data on the application server environment 201. After a given interval of time the entire evaluation process discussed above can be repeated. New applications that have been deployed within that interval can affect relative priorities ad updates to applications can affect their response-time goals. The autonomic and dynamic nature of the resource manager allows for adjusts to be automatically and dynamically made in response to these changes in the application server environment 201.

As can be seen from the above discussion, various embodiments of the present invention provide an advantageous system for the autonomic and dynamic creation/management of service policies that can be used to help facilitate the adoption of goals-oriented, virtualized middleware runtimes. An existing infrastructure can be analyzed for the assignment of relative priorities, response-time goals, and other such service-policy meta-data to a goals-oriented runtime environment like WebSphere XD. The creation and management process can then become fully autonomous where the analysis can be executed within some frequency and the service-policy data is adjusted to, for example, accommodate changes in application usage, and handle newly deployed applications by considering their effects on existing apps.

Example of an Information Processing System

Figure 5:
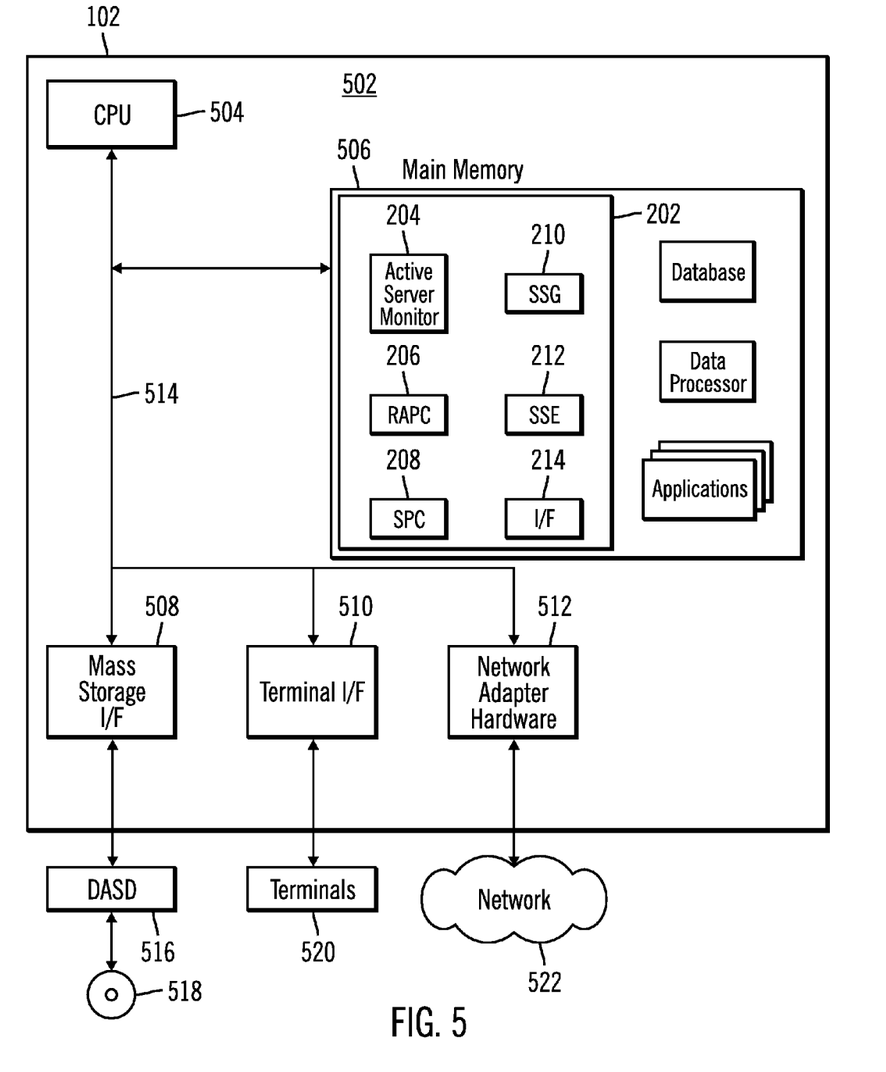
FIG. 5 is a block diagram illustrating an example of an information processing system environment according to an embodiment of the present invention.

FIG. 5 is a block diagram illustrating a more detailed view of an information processing system 102 according to an embodiment of the present invention. The information process system 102 can comprise the application server 201 including one or more of the components of FIG. 2. In another embodiment, the information process system 102 can comprise one or more of the components of FIG. 2 and be communicatively coupled to an application server 201 to be managed. The information processing system 102 is based upon a suitably configured processing system adapted to implement an embodiment of the present invention, according to the present example. Any suitably configured processing system is similarly able to be used as the information processing system 102 by various embodiments of the present invention such as an information processing system residing in the computing environment of FIG. 1, a personal computer, a workstation, or the like.

The information processing system 102 includes a computer 502. The computer 502 has a processor 504 that is connected to a main memory 506, mass storage interface 508, terminal interface 510, and network adapter hardware 512. A system bus 514 interconnects these system components. The mass storage interface 508 is used to connect mass storage devices, such as data storage device 516, to the information processing system 102. One specific type of data storage device is a computer readable medium such as a floppy disk drive, which may be used to store data to and read data from a CD 518 or a floppy diskette (not shown). Another type of data storage device is a data storage device configured to support, for example, NTFS type file system operations.

The main memory 506, in one embodiment, includes the resource manager 202. The resource manager, as discussed above, comprises the Active Server Monitor 204, a Relative Application Priority Calculator ("RAPC") 206, a Service Policy Calculator ("SPC") 208, a Server Script Generator ("SSG") 210, a Server Script Executor ("SSE") 212, and an administrative interface 214. The information processing system 102, in one embodiment, also includes a database 216 for storing application usage data. The Data Preprocessor 218 can also reside within the memory 506. It should be noted that one or more of these components can also reside on other information processing system communicatively coupled to the information processing system 102.

Although illustrated as concurrently resident in the main memory 506, it is clear that respective components of the main memory 506 are not required to be completely resident in the main memory 506 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 506 and data storage device 516. Note that the term "computer system memory" is used herein to generically refer to the entire virtual memory of the information processing system 102.

Although only one CPU 504 is illustrated for computer 502, computer systems with multiple CPUs can be used equally effectively. Various embodiments of the present invention further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with the information processing system 102. The terminal 520 is also able to consist of user interface and peripheral devices that are connected to computer 502 and controlled by terminal interface hardware included in the terminal I/F 510 that includes video adapters and interfaces for keyboards, pointing devices, and other devices/interfaces.

An operating system (not shown) included in the main memory is a suitable multitasking operating system such as the Linux, UNIX, Windows XP, and Windows Server 2001 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 102. The network adapter hardware 512 is used to provide an interface to a network 522. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 518, CD ROM, or other form of recordable media, or via any type of electronic transmission mechanism.

Example of a Process of Autonomic and Dynamic Service-Policy Management

Figure 6:
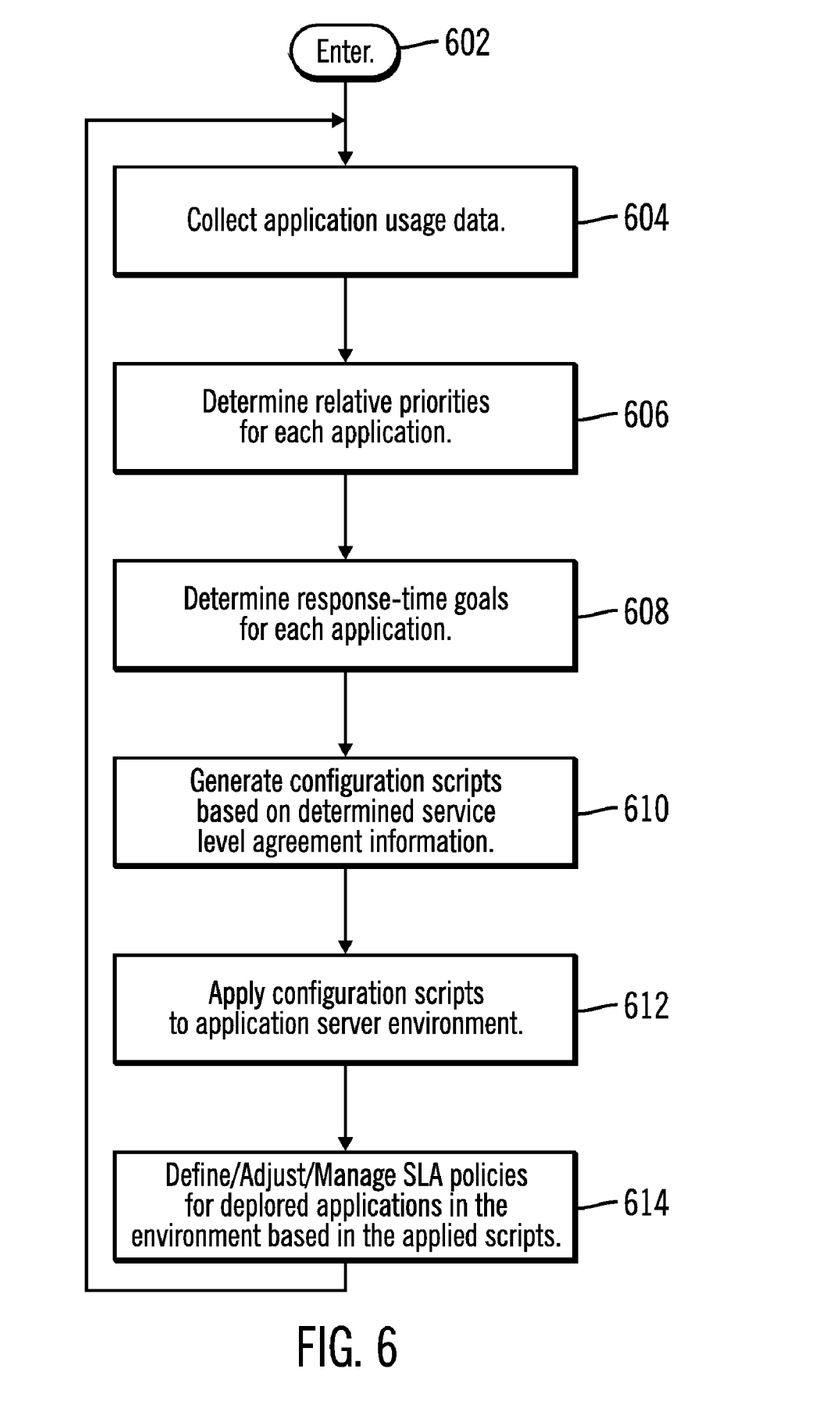
FIG. 6 is an operational flow diagram illustrating an overall process of automatically and dynamically creating and managing relative priorities and response-time goals for applications migrating from a static environment to a dynamic resource-sharing environment according to an embodiment of the present invention.

FIG. 6 is an operational flow diagram illustrating one example of automatically and dynamically creating and managing relative priorities and response-time goals for applications migrating from a static environment to a dynamic resource-sharing environment. The operational flow diagram of FIG. 6 begins at step 602 and flows directly to step 604. The Application Server Monitor 204, at step 604, collects application usage metadata from some one or more data sources such as (but not limited to) ITCAM and Apache HTTP logs. The RAPC 206, at step 606, analyzes the collected data and determines relative priorities for each application being deployed in the server application environment 201, as discussed above.

The SPC 208, at step 608, determines response-time goals based on the collected data for each application being deployed in the server application environment 201, as discussed above. The determined relative priorities and response-time goals are at least a portion of the Service Level Agreement being deployed in the server application environment 201. The SSG 210, at step 610, based at least in part on the relative priorities and response-time goals generates one or more configuration scripts. The SSE 212, at step 612, applies the configuration scripts to the application server environment 201. The executing configuration scripts, at step 614, define, adjust, and/or manager the SLA policies for deployed applications in the server application environment. The control flow returns to step 604 so that usage data is continued to be collected on the application server environment. This allows for any of the policies to be automatically and dynamically updated in response to changes in the application server environment such as new applications being deployed, which can affect relative priorities; and updates to applications, which can affect their response-time goals.

Example of a Process of Generating Relative Priorities

Figure 7:
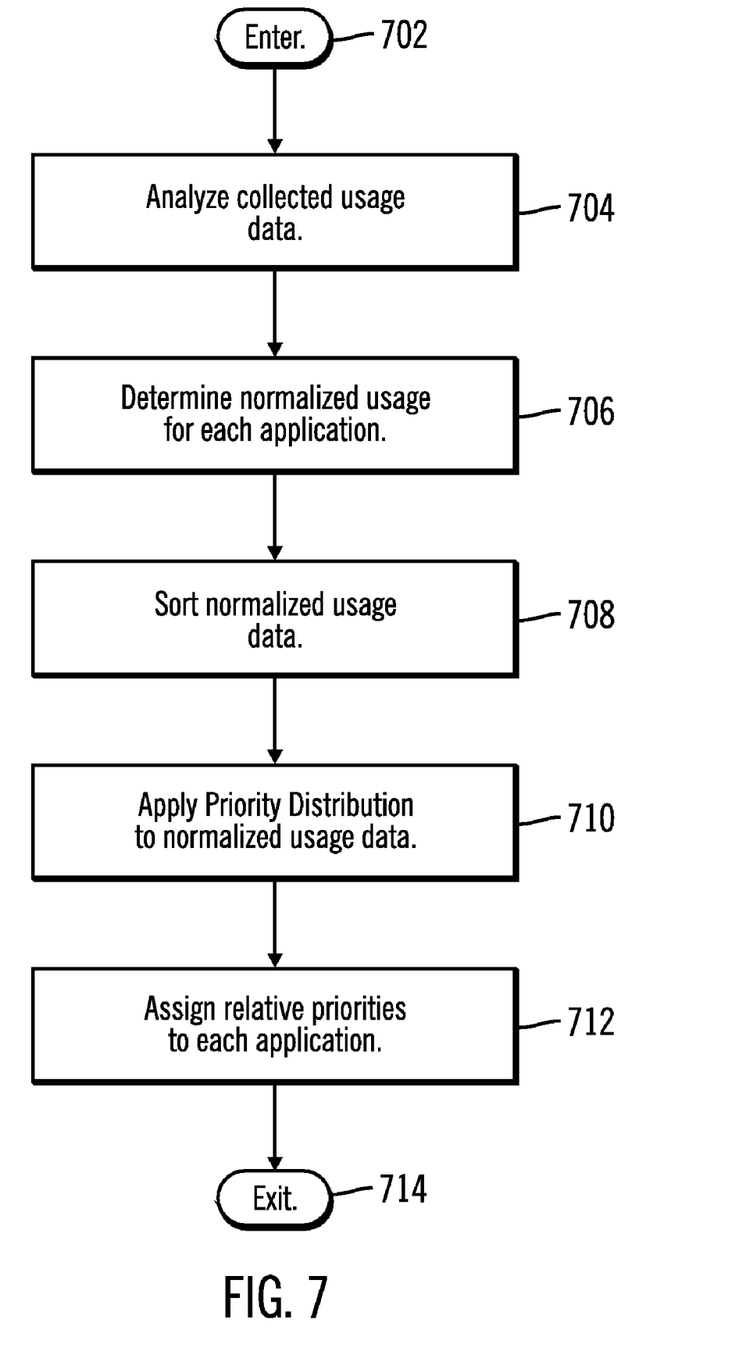
FIG. 7 is an operational flow diagram illustrating an overall process of determining relative priorities for applications according to an embodiment of the present invention.

FIG. 7 is an operational flow diagram illustrating one example of automatically and dynamically creating and managing relative priorities and response-time goals for applications migrating from a static environment to a dynamic resource-sharing environment. The operational flow diagram of FIG. 6 begins at step 602 and flows directly to step 604. The RAPC 206, at step 704, analyzes collected usage data. Normalized usage for each application, at step 706, is then determined. In one embodiment, the normalized usage metric is determined by dividing the number of hours an application was used by the total number of hours in the collected data. This value is then multiplied by the total number of invocations in the sample. The normalized usage data, at step 708, is then sorted. The RAPC 206, at step 710, applies a priority distribution to the normalized usage data. The RAPC 206, at step 712, assigns a relative priority level to each of the applications. The control flow then exits at step 714.

Example of a Process of Generating Response-Time Goals

Figure 8:
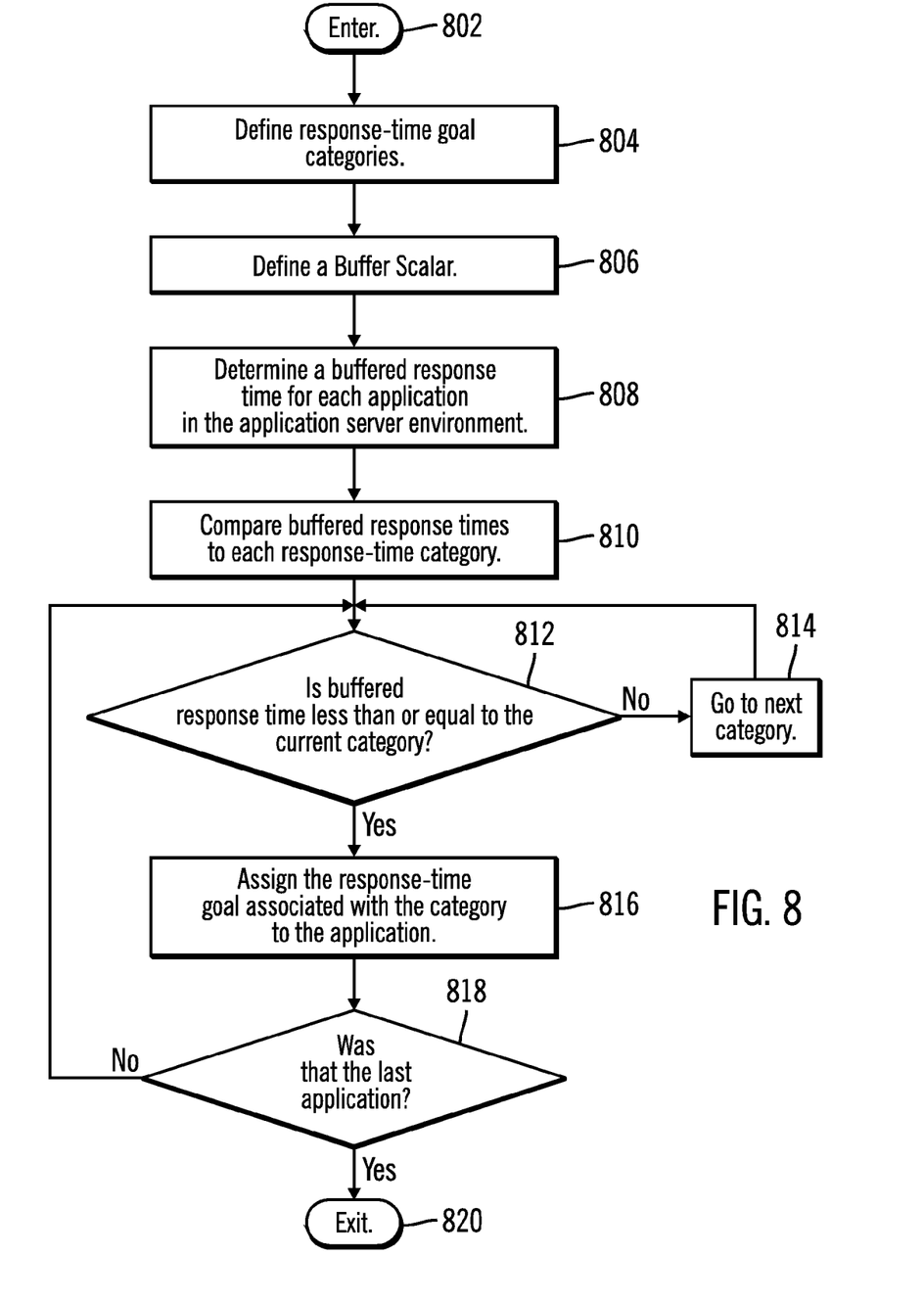
FIG. 8 is an operational flow diagram illustrating an overall process of determining response time goals for applications according to an embodiment of the present invention.

FIG. 8 is an operational flow diagram illustrating one example of generating response-time goals for each application being deployed in a server application environment. The operational flow diagram of FIG. 8 begins at step 802 and flows directly to step 704. Response-time categories, at step 804, are defined. A buffer scalar, at step 806, is also defined. The SPC 208, at step 808, determines a buffered response time for each application being deployed in the application server environment 201. In one embodiment, a buffered response time can be determined by multiplying a buffer scalar by the application response time.

The SPC 208, at step 810, compares the buffered response times to each response-time category. The SPC 208, at step 812, determines if the buffered response time of the current application being analyzed is less than or equal to the current response-time category being compared. If the result of this determination is negative, the SPC 208, at step 814, selects the next response-time category. The control flow returns to step 812. If the result of this determination is positive, the SPC 208, at step 816, assigns the response-time goal associated with the current response-time goal category to the application. The SPC 208, at step 818, determines if that application was the last application that needed to be assigned a response-time goal. If the result of this determination is negative, the control flows back to step 812. If the result of this determination is positive, the control flow exits at step 820.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for autonomic management of service policies for applications migrating from a static computing environment to a dynamic computing environment, the method comprising:
    executing on a processor residing at an information processing system the following:
    monitoring usage data associated with each application in a plurality of applications while initially deployed within a static computing environment wherein each application is associated with a dedicated resource;
    analyzing the usage data which has been monitored;
    normalizing, based on the analyzing, the usage data, wherein the normalizing comprises:
        dividing a number of hours an application was used by a total number of hours in the usage data that was monitored; and
        multiplying a result of the dividing by a total number of invocations of the application in a given sample;
    sorting the usage data that has been normalized;
    applying a priority distribution to the usage data the has been normalized and sorted;
    assigning a relative priority level to each application based on the priority distribution;
    generating, in response to the analyzing, a set of service level agreements associated with each application in the plurality of applications, the set of service level agreements being based on the usage data monitored in the static computing environment, wherein each service level agreement in the set of service level agreements indicates the relative priority level and at least one of a set of response times, and a set of response time goals associated with one of the each application in the plurality of applications; and
    configuring a dynamic resource sharing computing environment, where each application of the plurality of applications is subsequently deployed, with the set of service level agreements for managing resource sharing between each application of the plurality of applications deployed in the dynamic resource sharing computing environment.

2. The computer implemented method of claim 1, wherein the monitoring further comprises:
    determining a unit of time that each application was used within a given interval of time; and
    determining response time data associated with each application.

3. The computer implemented method of claim 1, wherein the generating further comprises:
    creating response time goals for each application.

4. The computer implemented method of claim 1, further comprising:
    generating, based on the service level agreements, configuration scripts for automatically configuring the computing environment.

5. The computer implemented method of claim 4, wherein the configuring further comprises:
    executing the configuration scripts at the computing environment, wherein the configuration scripts, dynamically and automatically without user intervention, configure the computing environment with the service level agreements.

6. The computer implemented method of claim 1, wherein the generating further comprises:
    receiving service level agreement data from a user.

7. The computer implemented method of claim 1, further comprising:
    monitoring the computing environment which has been configured;
    generating at least one new configuration script based on a current state of the computing environment; and
    dynamically adjusting the configuration of the computing environment via the at least one new configuration script.

8. An information processing system for autonomic management of service policies for applications migrating from a static computing environment to a dynamic computing environment, the information processing system comprising:
    a memory;
    a processor communicatively coupled to the memory; and
    a resource management module communicatively coupled to the memory and processor, wherein the resource management module is adapted to:
        monitor usage data associated with each application in a plurality of applications while initially deployed within a static computing environment wherein each application is associated with a dedicated resource;
        analyze the usage data which has been monitored;
        define a set of response-time categories each comprising a response-time goal;
        define a buffer scalar;

determine a buffered response time goal for each application by multiplying the buffer scalar by the application response time associated with each application;

compare the buffered response time goals for each application to each response-time category in the set of response-time categories;

assign a current application being analyzed the response-time goal of the response-time category in response to the buffered response time of the current application being less than or equal to the response-time category being compared;

generate, in response to the analyzing, a set of service level agreements associated with each application in the plurality of applications, the set of service level agreements being based on the usage data monitored in the static computing environment, wherein each service level agreement in the set of service level agreements indicates the response-time goal and at least one of a set of response times, and a set of priority levels associated with one of the each application in the plurality of applications; and configure a dynamic resource sharing computing environment, where each application of the plurality of applications is subsequently deployed, with the set of service level agreements for managing resource sharing between each application of the plurality of applications deployed in the dynamic resource sharing computing environment.

9. The information processing system of claim 8, wherein the monitoring further comprises:

determining a unit of time that each application was used within a given interval of time; and determining response time data associated with each application.

10. The information processing system of claim 8, wherein the generating further comprises:

creating relative priorities for each application for each application.

11. The information processing system of claim 8, wherein the resource manager is further adapted to:

generate, based on the service level agreements, configuration scripts for automatically configuring the computing environment.

12. The information processing system of claim 11, wherein the configuring further comprises:

executing the configuration scripts at the computing environment, wherein the configuration scripts, dynamically and automatically without user intervention, configure the computing environment with the service level agreements.

13. The information processing system of claim 8, wherein the generating further comprises:

receiving service level agreement data from a user.

14. The information processing system of claim 8, wherein the resource manager is further adapted to:

monitor the computing environment which has been configured;

generate at least one new configuration script based on a current state of the computing environment; and dynamically adjust the configuration of the computing environment via the at least one new configuration script.

15. A non-transitory computer readable storage medium for autonomic management of service policies for applications migrating from a static computing environment to a dynamic computing environment, the computer readable storage medium comprising instructions for:

monitoring usage data associated with each application in a plurality of applications while initially deployed within a static computing environment wherein each application is associated with a dedicated resource;

analyzing the usage data which has been monitored;

normalizing, based on the analyzing, the usage data, wherein the normalizing comprises:

dividing a number of hours an application was used by a total number of hours in the usage data that was monitored; and multiplying a result of the dividing by a total number of invocations of the application in a given sample;

sorting the usage data that has been normalized;

applying a priority distribution to the usage data the has been normalized and sorted;

assigning a relative priority level to each application based on the priority distribution;

generating, in response to the analyzing, a set of service level agreements associated with each application in the plurality of applications, the set of service level agreements being based on the usage data monitored in the static computing environment, wherein each service level agreement in the set of service level agreements indicates the relative priority level and at least one of a set of response times, and a set of response time goals associated with one of the each application in the plurality of applications; and configuring a dynamic resource sharing computing environment, where each application of the plurality of applications is subsequently deployed, with the set of service level agreements for managing resource sharing between each application of the plurality of applications deployed in the dynamic resource sharing computing environment.

16. The non-transitory computer readable storage medium of claim 15, wherein the instructions for monitoring further comprise instructions for:

determining a unit of time that each application was used within a given interval of time; and determining response time data associated with each application.

17. The non-transitory computer readable storage medium of claim 15, wherein the generating further comprises:

creating at least one of relative priorities for each application and response time goals for each application.

18. The non-transitory computer readable storage medium of claim 15, further comprising instructions for:

generating, based on the service level agreements, configuration scripts for automatically configuring the computing environment; and executing the configuration scripts at the computing environment, wherein the configuration scripts, dynamically and automatically without user intervention, configure the computing environment with the service level agreements.

19. The non-transitory computer readable storage medium of claim 15, wherein the instructions for generating further comprise instructions for:

receiving service level agreement data from a user.

20. The non-transitory computer readable storage medium of claim 15, further comprising instructions for:

monitoring the computing environment which has been configured;

generating at least one new configuration script based on a current state of the computing environment; and dynamically adjusting the configuration of the computing environment via the at least one new configuration script.

* * * * *